July 1, 1930.  G. F. HITCHCOCK ET AL  1,768,764
AUTOMATIC VALVE MECHANISM
Filed July 2, 1928
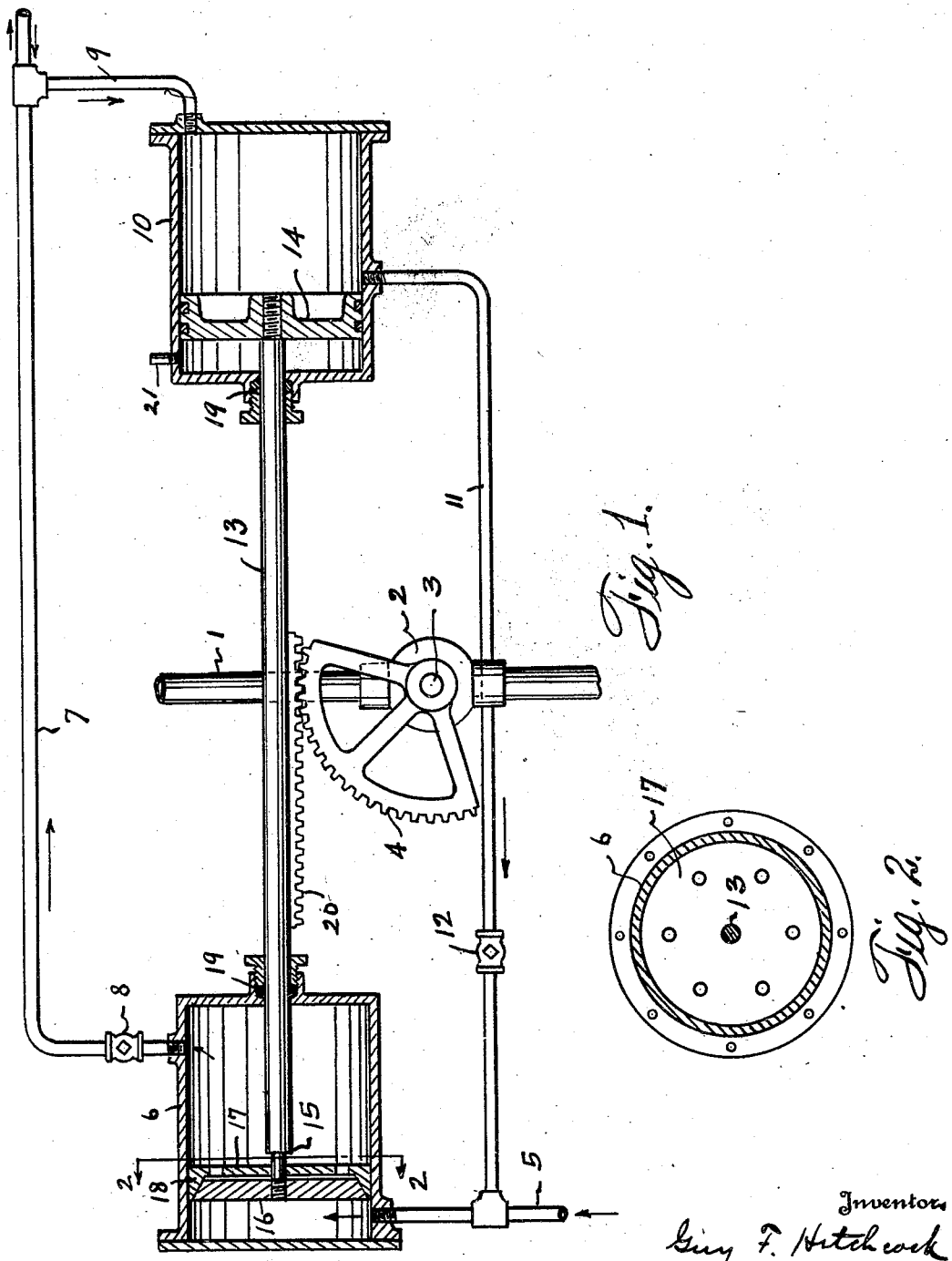
Inventors
Guy F. Hitchcock
Thomas H. Meeks
By Hardway Cathey
Attorneys Patented July 1, 1930

1,768,764

UNITED STATES PATENT OFFICE

GUY F. HITCHCOCK AND THOMAS H. MEEKS, OF HOUSTON, TEXAS

AUTOMATIC VALVE MECHANISM

Application filed July 2, 1928. Serial No. 289,964.

This invention relates to new and useful improvements in an automatic valve mechanism.

One object of the invention is to provide a mechanism of the character described specially designed for the purpose of controlling the flow of gas through the gas line leading to the burner of an automatic water heater.

Another object of the invention is to provide a mechanism of the character described incorporated into the water line leading to the heater coil and operatively connected with the gas line valve and through which the gas line may be opened when water is being drawn from the service line leading from the water coil and closed when the service faucet is closed to shut off the supply of water.

With the above and other objects in view the invention has particular relation to certain novel features of construction, operation and arrangement of parts, an example of which is given in this specification and illustrated in the accompanying drawings wherein:—

Figure 1 shows a side elevation of the mechanism partly in section, and

Figure 2 shows a transverse sectional view taken on the line 2—2 of Figure 1.

Referring now more particularly to the drawings wherein like numerals of reference designate similar parts in each of the figures. The numeral 1 designates the gas line through which gas may be conducted to the burner of a gas water heater. Incorporated into this line there is a valve 2 having the stem 3 to the outer end of which a segmental rack 4 is secured. The numeral 5 designates a water supply line which enters the outer end of the cylinder 6 and leading out from this cylinder near its other end is the flow line 7 which leads to the coil. This line 7 is controlled by the one way back pressure valve 8. A pressure line 9 is connected into the line 7 and also into the outer end of the cylinder 10. This cylinder 10 is aligned with and spaced from the cylinder 6. A return line 11 is connected at one end into the inlet line 5, is provided with the one way back pressure valve 12, and has its other end connected into the cylinder 10 intermediate its ends, said lines 9 and 11 thus forming a pressure conduit leading back into the supply line 5. There is a piston rod 13 to one end of which the piston 14 in the cylinder 10 is attached. The other end of this piston rod is reduced forming the shoulder 15 and the reduced end of the plunger rod is attached to a circular disc 16 which cooperates with the perforated plate 17 slidably mounted on the reduced end of the piston rod 13 between the disc 16 and the shoulder 15. The plate 17 has a marginal outwardly flared rim 18 and the margin of the disc 16 is beveled to conform to the flare of the rim 18. The disc 16 and the plate 17 form in effect, a piston that fits closely in the cylinder 6. The rod 13 works through the stuffing boxes 19, 19 carried by the facing ends of said cylinders and said rod has a rack 20 which is in mesh with the rack 4.

When the service faucet is open, water will flow in through the line 5, and the water pressure against the outer end of the piston in the cylinder 6 will force said piston forwardly until it clears the end of the line 7, and the water will then flow through said line 7 on to the coil where it is heated, and out through the service line, (not shown). The valve 12 will serve to prevent the outward flow of water through the lines 11, 9.

As the piston rod 13 is thus actuated it will carry the piston 14 outwardly in the cylinder 10 operating through the racks 20 and 4 to open the valve 2 to permit the gas to flow to the burner, and the plunger 14 will, in this position, block the back flow of fluid through the lines 9 and 11. When the service faucet is closed, pressure will accumulate in the coil and this pressure will work back through the lines 7 and 9 and force the plunger 14 backwardly in the cylinder 10, the air in front of said piston escaping through the relief outlet 21. Upon such backward movement the rack 4 will be operated to close the valve 2 and cut off the supply of gas and the line 11 will be opened to permit the pressure to then escape to the line 5. As the piston rod 13 is moved backwardly it will carry the disc 16 away from the plate 17 and said plate will be carried back by the shoulder 15 the water in front of the disc 16 passing through the perforations of the plate 17.

While we have shown what we now consider the preferred form of the invention, it is obvious that mechanical changes may be made therein and equivalents substituted for the parts shown and we reserve the right to make such mechanical changes and substitutions as may be found practical within the principle of the invention as defined by the appended claims.

What we claim is:—

1. The combination with a gas supply line having a control valve, of a reciprocable rod operatively connected with said valve, a piston attached to each end of the rod, a cylinder in which each piston is fitted, a water supply conduit connected into one cylinder on one side of the corresponding piston, a water conducting line leading out from said cylinder intermediate the ends thereof, a pressure line leading from said conducting line and entering the other cylinder on one side of the corresponding piston, a relief line leading from said last mentioned cylinder, intermediate its ends and connected into said supply line.

2. The combination with a gas supply line having a control valve, of a reciprocable rod operatively connected with said valve, a piston attached to each end of the rod, a cylinder in which each piston is fitted, a water supply conduit connected into one cylinder on one side of the corresponding piston, a water conducting line leading out from said cylinder intermediate the ends thereof, a pressure line leading from said conducting line and entering the other cylinder on one side of the corresponding piston, a relief line leading from said last mentioned cylinder, intermediate its ends and connected into said supply line, and one way back pressure valves incorporated into said conducting line and said relief line.

3. The combination with a gas supply line having a control valve, a water supply line, and a pressure conduit connected at its respective ends into said water supply line; of cylinders, one incorporated into the water supply line and one incorporated into the pressure line, a piston in each cylinder and adapted to alternately open and close the corresponding line, a piston rod operatively connected with, and adapted to actuate said valve.

4. The combination with a gas supply line having a control valve, a water supply line, and a pressure conduit connected at its respective ends into said water supply line; of cylinders, one incorporated into the water supply line and one incorporated into the pressure line, a piston in each cylinder and adapted to alternately open and close the corresponding line, a piston rod operatively connected with, and adapted to actuate said valve, said pistons being arranged to close the water supply line and simultaneously open the pressure line and vice versa.

5. The combination with a gas supply line having a control valve, a fluid supply line, and a pressure conduit connected at its respective ends into said fluid supply line; of cylinders incorporated one into the fluid supply and one into the pressure line, a piston in each cylinder, one subject to the pressure of the fluid flowing through the fluid supply line and the other subject to the pressure of the fluid in the pressure line, a piston rod connected to said pistons and operatively connected with and adapted to actuate said valve.

6. The combination with a gas supply line having a control valve, a fluid supply line, and a pressure conduit connected at its respective ends into said fluid supply line; of cylinders incorporated one into the fluid supply and one into the pressure line, a piston in each cylinder, one subject to the pressure of the fluid flowing through the fluid supply line and the other subject to the pressure of the fluid in the pressure line, a piston rod connected to said pistons and operatively connected with and adapted to actuate said valve, said pistons being arranged to open one of said lines and simultaneously close the other, alternately.

In testimony whereof we have signed our names to this specification.

GUY F. HITCHCOCK.
THOMAS H. MEEKS.